Patented Nov. 26, 1940

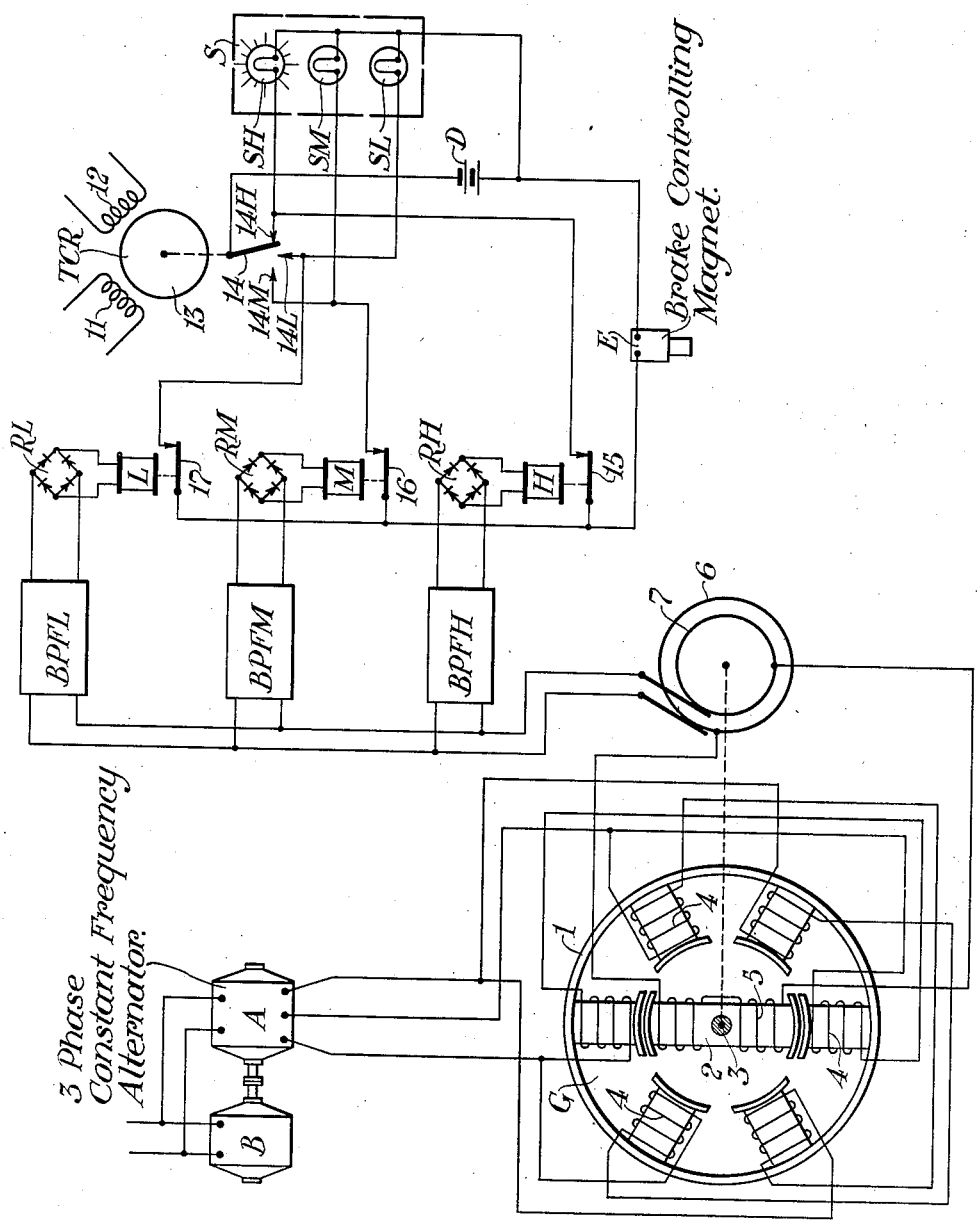

2,222,801

UNITED STATES PATENT OFFICE 2,222,801

SPEED RESPONSIVE APPARATUS

John W. Logan, Jr., Forest Hills, Pa., assignor to The Union Switch & Signal Company, Swissvale, Pa., a corporation of Pennsylvania Application July 7, 1939, Serial No. 283,235

2 Claims. (Cl. 246—182)

My invention relates to speed responsive apparatus.

Speed responsive apparatus embodying my invention is particularly suitable for, although in no way limited to, use for controlling circuits in conjunction with train control systems for railroads.

One object of my invention is to improve the apparatus described and claimed in an application for Letters Patent of the United States Serial No. 166,378, filed by Andrew J. Sorensen, on September 29, 1937, for Speed responsive apparatus.

Another object of my invention is to provide a frequency converter, the rotor of which is driven at a speed corresponding to that of the body or device whose speed is to be controlled or determined, and the output of which has a frequency which is a maximum when the body is at rest and decreases as the speed of the body increases.

Other objects and characteristic features of my invention will become apparent as the description proceeds.

I shall describe one form of speed responsive apparatus embodying my invention, and shall then point out the novel features thereof in claims.

The accompanying drawing is a diagrammatic view illustrating one form of speed responsive apparatus embodying my invention.

The speed responsive apparatus here shown comprises a frequency converter G, having a stator 1 and a rotor 2. The rotor 2 is intended to be driven at a speed which is proportional to the angular or linear speed of any body whose speed it is desired to have the apparatus respond to, and since apparatus embodying my invention is particularly suitable for, although in no way limited to, use on a railway vehicle for train control purposes, I have shown the rotor in the drawing as being mounted on and secured to, a railway vehicle axle 3. When the rotor is secured to the axle in this manner, the stator will of course be secured to the vehicle frame, and the unit thus formed may be referred to for convenience as an axle unit in accordance with customary practice.

The stator 1 is provided with a three-phase winding 4, while the rotor 2 is provided with a winding 5 the terminals of which are secured to a pair of slip rings 6 and 7. The three-phase winding 4 is constantly supplied with alternating current having a constant preselected frequency from a suitable source, here shown as a three-phase alternator A driven by a direct current motor B, in such manner that a rotating magnetic field will be set up in the stator having the same direction of rotation as the direction of rotation of the rotor 2 when the vehicle is in motion. It will be apparent, therefore, that when the vehicle is at rest, an alternating current will be induced in the rotor winding 5 having the same frequency as that of the current which is supplied to the stator winding, but that, as the vehicle accelerates, the rotating magnetic field will pass by the rotor a diminishing number of times per second, whereby the frequency of the voltage induced in the winding 5 will decrease with increases in the speed of the vehicle. Obviously, if the preselected frequency is low enough, the frequency of the current induced in the winding 5 can reach zero. For purposes of my present invention, however, this is undesirable, and I therefore select for the frequency of the current supplied to the stator a value sufficiently high so that the rotor can never reach synchronous speed at any speed which the vehicle might attain.

It should be particularly pointed out that while in illustrating my invention I have shown the rotor 2 mounted on a vehicle axle 3, the rotor could equally well be belt driven or gear driven, or connected with any other part of the vehicle in any suitable manner which will cause it to rotate at a speed which is proportional to the speed of the vehicle.

The alternating current generated in the rotor winding 5 is selectively supplied to three relays L, M and H through the medium of band-pass frequency filters BPFL, BPFM and BPFH, and rectifiers RL, RM and RH. The band-pass filter BPFL is so constructed that it will pass sufficient current to energize relay L as long as the frequency of the current supplied by winding 5 remains above that corresponding to a low vehicle speed, for example 15 miles per hour. Similarly, the band-pass filter BPFM is so constructed that it will pass sufficient current to energize relay M as long as the frequency of the current supplied by winding 5 remains above that corresponding to a medium vehicle speed, for example 40 miles per hour, while the band-pass filter BPFH is so constructed that it will pass sufficient current to energize relay H as long as the frequency of the current supplied by winding 5 remains above that corresponding to a high vehicle speed, for example 80 miles per hour. Band-pass filters of the type referred to are well-known and it is not believed to be necessary, therefore, to describe them in further detail herein.

With the relays L, M and H connected with the winding 5 in the manner described it will be apparent that when the vehicle is at rest, all three relays will be energized, but that, as the vehicle speed increases, relay L will become deenergized when the speed exceeds 15 miles per hour, relay M will become deenergized when the vehicle speed exceeds 40 miles per hour, and relay H will become deenergized when the vehicle speed exceeds 80 miles per hour.

It should be noted that since the frequency of the current induced in winding 5 decreases with increases in vehicle speed, the magnitude of the voltage induced in this winding will also decrease with increases in vehicle speed, and that, this decrease in voltage is of material assistance in getting a sharp cut-off for dropping out the different relays in response to increases in the vehicle speed.

The relays L, M and R may be utilized in any desired manner to control the speed of the vehicle, or for any other suitable purpose. As here shown, these relays are utilized, in connection with a train control relay TCR, to enforce a speed limit on the vehicle in accordance with traffic conditions in advance in a manner which will now be made clear.

The train control relay TCR in the form illustrated is of the induction motor type, and comprises two stator windings 11 and 12 and a rotor 13. The rotor operates a movable contact finger 14 which cooperates with three fixed contact fingers 14H, 14M and 14L to form contacts 14—14H, 14—14M and 14—14L, respectively. The relay is controlled by traffic conditions in advance of the train in such manner that when traffic conditions are clear, so that it is permissible for the train to travel at a high speed, the finger 14 will be swung to the right to the position shown in which the contact 14—14H is closed, but that when traffic conditions in advance are such that it is only permissible for the train to proceed at medium speed, the finger will then be swung to the left to the position in which the contact 14—14M is closed, and that when traffic conditions in advance are such as to require a low speed limit, the contact finger will move to its intermediate position in which the contact 14—14L is closed. The apparatus for controlling relay TCR forms no part of my present invention and is therefore not shown in the drawing.

The reference character E designates a brake controlling magnet which applies the brakes to the vehicle when the magnet becomes deenergized. This magnet is provided with a high speed circuit which includes a suitable source of current here shown as a battery D, contact 14—14H of relay TCR and front contact 15 of relay H. Magnet E is also provided with a medium speed circuit which includes battery D, contact 14—14M of relay TCR and front contact 16 of relay M. Magnet E is further provided with a low speed circuit which includes battery D, contact 14—14L of relay TCR and front contact 17 of relay L.

The apparatus also includes a speed limit indicator or cab signal S comprising three lamps SH, SM and SL, which lamps when lighted indicate high speed, medium speed and low speed, respectively. The high speed lamp SH is provided with an energizing circuit which includes battery D and contact 14—14H of relay TCR, and it will be apparent, therefore, that this lamp will be lighted when and only when traffic conditions in advance are clear.

The medium speed lamp is provided with an energizing circuit which includes battery D and contact 14—14M of relay TCR, and it follows that this lamp will be lighted when and only when traffic conditions in advance are such that it is safe for the vehicle to proceed at medium speed.

The low speed lamp SL is provided with a circuit which includes battery D and contact 14—14L of relay TCR, and it will be obvious that this latter lamp will be lighted when and only when traffic conditions in advance are such that the vehicle is required to proceed at a low speed.

With the apparatus constructed in this matter, when the high speed lamp SH is lighted, magnet E will be energized over the high speed circuit provided the speed of the vehicle remains below 80 miles per hour. If, however, when this lamp is lighted the speed of the vehicle exceeds 80 miles per hour, relay H will become deenergized and will interrupt the circuit for magnet E to thereby apply the brakes to the vehicle, and thus prevent the vehicle from exceeding the high speed limit.

Likewise, when the medium speed lamp is lighted, as long as the vehicle speed remains below 40 miles per hour, magnet E will be energized over the medium speed circuit, but if the speed of the vehicle exceeds 40 miles per hour, relay M will then become deenergized and will interrupt the medium speed circuit, whereupon magnet E will apply the brakes to the vehicle.

In a similar manner, when the low speed lamp is lighted, magnet E will be energized over the low speed circuit as long as the vehicle speed remains below 15 miles per hour, but if the vehicle speed exceeds this speed, the low speed circuit will become interrupted at contact 17 of relay L, and magnet E will become deenergized and will apply the brakes to the vehicle to enforce the low speed limit.

It should be pointed out that with apparatus constructed in accordance with my invention short circuits or open circuits in the axle unit or generator G will cause the relays L, M and H to assume the high speed position, that is to become deenergized. As a result, the system is inherently safe, and it is unnecessary therefore to utilize special precautions to distinguish between zero speed of the vehicle and the condition which would occur if the wires from the axle unit or frequency converter G were broken or short circuited.

Although I have herein shown and described only one form of speed responsive apparatus embodying my invention, it is understood that various changes and modifications may be made therein within the scope of the appended claims without departing from the spirit and scope of my invention.

Having thus described my invention, what I claim is:

1. The combination with a vehicle, of a frequency converter on said vehicle having a stator which is constantly supplied with alternating current at a preselected constant frequency to produce a rotating magnetic field and a wound rotor which is driven at a speed which is proportional to the speed of the vehicle in the same direction as said rotating field, said preselected frequency being sufficiently high so that said rotor will always be rotated at less than synchronous speed, whereby the frequency of the current induced in said rotor winding will decrease with increases in the speed of said vehicle, a plurality of relays supplied with current from said rotor through frequency responsive means so constructed that said relays will normally all be energized when the vehicle is at rest but will become successively deenergized as the frequency of said current decreases due to increases in vehicle speed, and governing means on the vehicle controlled by said relays.

2. The combination with a vehicle, of a frequency converter on said vehicle having a stator which is constantly supplied with alternating current at a preselected constant frequency to produce a rotating magnetic field and a wound rotor which is driven at a speed which is proportional to the speed of the vehicle in the same direction as said rotating field, said preselected frequency being sufficiently high so that said rotor will always be rotated at less than synchronous speed, whereby the frequency of the current induced in said rotor winding will decrease with increases in the speed of said vehicle, a plurality of relays supplied with current from said rotor through frequency responsive means so constructed that said relays will normally all be energized when the vehicle is at rest but will become successively deenergized as the frequency of said current decreases due to increases in vehicle speed, apparatus on the vehicle controlled from the trackway and arranged to assume different conditions in response to different traffic conditions in advance of the vehicle, and mechanism controlled jointly by said relays and said apparatus for preventing the vehicle from exceeding a speed which depends on traffic conditions in advance, said mechanism being effective to stop said vehicle in the event of the failure of the current supplied by said rotor.

JOHN W. LOGAN, Jr.